United States Patent [19]  [11] 4,009,154
Noma et al.  [45] Feb. 22, 1977

[54] PROCESS FOR PREPARING AROMATIC POLYAMIDES WITH SODIUM CARBONATE HYDRATE AS ACID ACCEPTOR

[75] Inventors: Takashi Noma, Hino; Hiroshi Fujie, Iwakuni; Shuji Ozawa, Hachioji, all of Japan

[73] Assignee: Teijin Limited, Osaka, Japan

[22] Filed: May 29, 1975

[21] Appl. No.: 582,403

[30] Foreign Application Priority Data

June 3, 1974 Japan ............................ 49-61786
Aug. 1, 1974 Japan ............................ 49-87490

[52] U.S. Cl. ................. 260/78 SC; 260/47 CZ; 260/63 N; 260/65; 260/78 R; 260/78 A
[51] Int. Cl.$^2$ ................. C08G 69/48; C08G 69/28
[58] Field of Search ................. 260/78 R, 78 SC

[56] References Cited
UNITED STATES PATENTS 3,640,970  2/1972  Ozawa et al. .................. 260/78 R Primary Examiner—Harold D. Anderson
Attorney, Agent, or Firm—Wenderoth, Lind & Ponack

[57] ABSTRACT

A process for preparing aromatic polyamides which comprising contacting (I) a solution or dispersion consisting of a solution or dispersion in a polar, non-basic and inert organic liquid medium of at least one starting material selected from the group consisting of i. an aromatic aminocarboxylic acid halide hydrohalogenide,
ii. a mixture of an aromatic dicarboxylic acid halide and an aromatic diamine dihydrohalogenide, and
iii. a low molecular weight aromatic polyamide having an inherent viscosity of no greater than 0.2 as measured on a solution of 0.5 gram of the polyamide in 100 ml of concentrated sulfuric acid at 30° C., with (II) an aqueous slurry consisting of a dispersion in water of a sodium carbonate hydrate.

5 Claims, No Drawings

PROCESS FOR PREPARING AROMATIC POLYAMIDES WITH SODIUM CARBONATE HYDRATE AS ACID ACCEPTOR

This invention relates to a process for preparing with good efficiency aromatic polyamides of high degree of polymerization.

As one of the hitherto known processes for preparing aromatic polyamides, there is the so-called oligomer polymerization process wherein the aromatic polyamides are obtained from the aromatic diamines and aromatic dicarboxylic acid halides by carrying out the polymerization operation by a two-stage process (U.S. Pat. No. 3,640,970).

The oligomer polymerization process can be said to be an excellent method, since the degree of polymerization can be readily controlled, the production of the polyamides on a large scale is possible, and moreover the resulting polymers can be obtained in a state in which they do not contain inorganic salts. In this oligomer polymerization process an aromatic diamine and an aromatic dicarboxylic acid halide are reacted in a polar, non-basic and inert organic liquid medium in the absence of an acid acceptor to prepare a solution or dispersion containing low molecular weight aromatic polyamides (oligomers) and, as the case may be, aromatic diamine dihydrohalogenides as byproducts and unreacted aromatic dicarboxylic acid halides, after which the polymerization is completed by contacting this solution or dispersion with an acid acceptor. According to this process, since the low molecular weight aromatic polyamide and the acid acceptor need not be contacted in a short period of time, it is possible to readily obtain high polymers without being hardly affected by the charging time. In addition, as it is possible to employ an apparatus of large capacity, it is advantageous from the standpoint of commercial production.

Further, the reaction for forming aromatic polyamides from aromatic diamines and aromatic dicarboxylic acid halides is usually an exothermic reaction. Hence unless the heat of reaction is removed externally of the system, the temperature of the polymerization system rises, and in concomitance therewith various side reactions are set up, with the consequence that due to the influence of such side reactions the enhancement of the degree of polymerization becomes difficult of achievement. The oligomer polymerization process has an advantage in this respect also, for it is carried out in two stages, with the consequence that the removal of the heat of reaction is simplified and polyamides of high degree of polymerization can be readily obtained.

Thus, the oligomer polymerization process possesses various advantages. However, when it is attempted to obtain the aromatic polyamides by using an organic liquid medium containing the aromatic diamines and aromatic dicarboxylic acid halides in high concentrations with the intent of improving on the efficiency of the process, there was the drawback that only aromatic polyamides of low degree of polymerization could be obtained.

On the other hand, also known are the processes of preparing the aromatic polyamides in a single step by contacting an aqueous solution of an acid acceptor with either an organic liquid medium containing an aromatic aminocarboxylic acid halide hydrohalogenide or an organic liquid medium containing an equimolar mixture of an aromatic dicarboxylic acid halide and an aromatic diamine dihydrohalogenide. However, these processes had the same drawbacks as in the case with the hereinbefore-described process.

An object of the present invention resides in improving on these drawbacks of the conventional processes, i.e., an object of the invention resides in providing a process for preparing with good efficiency aromatic polyamides of high degree of polymerization by using a polar, non-basic and inert organic liquid medium containing the starting materials in high concentrations.

Other objects and advantages of the invention will become apparent from the following description.

We found that the foregoing objects of the invention could be achieved by the use as the acid acceptor of a sodium carbonate hydrate in the form of an aqueous slurry instead of the aqueous solution of an alkali compound as used in the conventional processes.

Thus, there is provided in accordance with the present invention a process for preparing aromatic polyamides which comprises contacting (I) a solution or a dispersion consisting of a solution or dispersion in a polar, non-basic and inert organic liquid medium in a high concentration of preferably at least 5 weight %, especially 15 – 60 weight %, and more especially 25 – 50 weight %, of at least one starting material selected from the group consisting of i. an aromatic aminocarboxylic acid halide hydrohalogenide,
ii. a mixture, and preferably an equimolar mixture, of an aromatic dicarboxylic acid halide and an aromatic diamine dihydrohalogenide, and
iii. a low molecular weight aromatic polyamide having an inherent viscosity of no greater than 0.2 as measured on a solution of 0.5 g of the polyamide in 100 ml of concentrated sulfuric acid at 30° C., with (II) an aqueous slurry consisting of a dispersion in water in a concentration of preferably at least 5 weight %, especially 10 – 60 weight %, and more especially 15 – 50 weight %, of a sodium carbonate hydrate.

The aromatic aminocarboxylic acid halide hydrohalogenide used in the invention process as the starting material i) has either the following general formula (1) or (2).

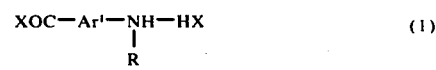

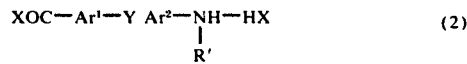

wherein X is halogen, of which chlorine is preferred; $Ar^1$ and $Ar^2$ are each a divalent aromatic ring, it being preferred that the two amino groups are attached to carbon atoms that are not adjacent to each other; R and R' are each either hydrogen, a lower alkyl or phenyl group; and Y is an atom or group which connects the adjacent aromatic rings and is, for example, $-O-$, $-S-$, $-SO_2-$,

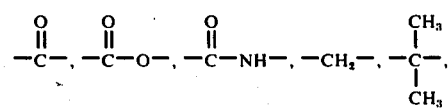

$-SO_2NH-$, $-CH=CH-$, $-N=N-$ and $-CH=N-$.

In the foregoing general formula, the aromatic rings as represented by Ar¹ and Ar² are such carbocyclic aromatic rings as

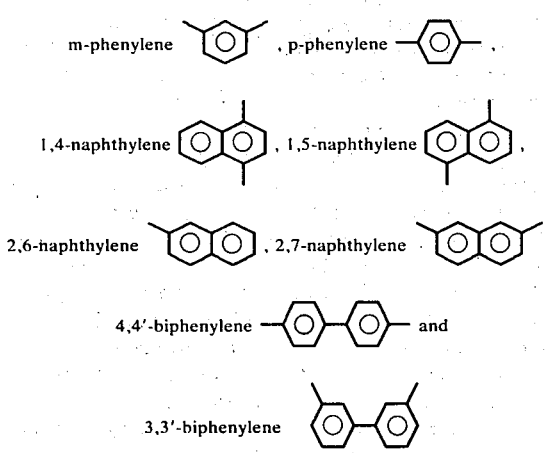

and such heterocyclic aromatic rings as

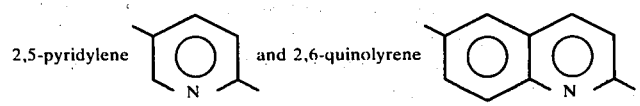

The hydrogen atoms of these aromatic rings may be substituted by a substituent group that does not react with the acid halide and amino groups. As such substituent groups, there can be named the halogens, lower alkyl, phenyl, carboalkoxy, alkoxy, acyloxy, nitro, dialkylamino, thioalkyl, carboxyl and sulfonic acid groups.

As specific examples of such aromatic aminocarboxylic acid halide hydrohalogenides, mention can be made of m-aminobenzoylchloride hydrochloride, p-aminobenzoylchloride hydrochloride, 1-amino-naphthalene-5-carboxylic acid chloride hydrochloride and 4-amino-biphenyl-4'-carboxylic acid chloride hydrochloride.

The aromatic dicarboxylic acid halide to be used as one of the components of the starting material (ii) in the present invention has the following general formula (3) or (4).

wherein X is halogen, of which chlorine is to be preferred; Ar³ and Ar⁴ are divalent aromatic rings as in the case with Ar¹ and Ar²; and Y is either an atom or a group as hereinbefore defined.

Specific examples of these aromatic dicarboxylic acid dihalides are isophthalic acid chloride, terephthalic acid chloride, 2,6-naphthalenedicarboxylic acid chloride, 4,4'-biphenyldicarboxylic acid chloride, 5-chloroisophthalic acid chloride, 4'-methylisophthalic acid chloride, methylterephthalic acid chloride and bis(p-chloroformylphenyl)ether.

The aromatic diamine dihydrohalogenide used as the other component of the starting material (ii) in this invention has the following general formula (5) or (6).

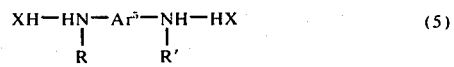

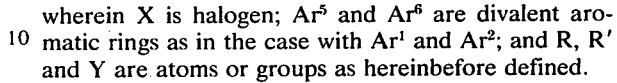

wherein X is halogen; Ar⁵ and Ar⁶ are divalent aromatic rings as in the case with Ar¹ and Ar²; and R, R' and Y are atoms or groups as hereinbefore defined.

As specific examples of such aromatic diamine dihydrohalogenides, there can be named such compounds as m-phenylenediamine dihydrochloride, p-phenylenediamine dihydrochloride, chlorophenylenediamine dihydrochloride, methylphenylenediamine dihydrochloride, aminoanisidine dihydrochloride, N-methyl-p-phenylenediaine dihydrochloride, N,N'-dimethyl-p-phenylenediamine dihydrochloride, N-phenyl-p-phenylenediamine dihydrochloride, 1,5-naphthylenediamine dihydrochloride, benzidine dihydrochloride, bis(aminophenyl)ether dihydrochloride, bis(aminophenyl)methane dihydrochloride, bis(aminophenyl)ketone dihydrochloride, bis(aminophenyl)sulfone dihydrochloride, diaminobenzanilide dihydrochloride, N,N'-phenylenebis(aminobenzamido)dihydrochloride, diaminoazobenzene dihydrochloride, diaminostilbene dihydrochloride, diaminobenzenesulfonic acid anilide dihydrochloride and m-phenylenediamine dihydrobromide.

The low melecular weight aromatic polyamide having an inherent viscosity of no greater than 0.2 as measured on a solution of 0.5 g of the polyamide in 100 ml of concentrated sulfuric acid at 30° C. and used as the starting material (iii) in the invention process is a compound having the following formula (7), (8) or (9).

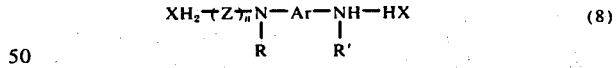

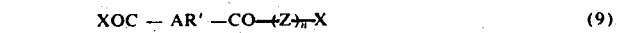

wherein X is halogen; Z is

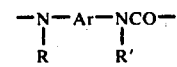

or Ar'—CO—; Ar and Ar', which may be the same or different, are divalent aromatic rings; R and R' are, as hereinbefore defined, either hydrogen or a lower alkyl or a phenyl group; and n is an integer from 1 to 10.

As examples of the foregoing Ar and Ar', there can be named those which are the same as Ar¹ and Ar², it being preferred that the two amino groups are attached to carbon atoms not adjacent to each other in the ring. Again, the hydrogen atom of these benzene rings may be substituted by substituent groups that do not react with the acid halide and amino groups.

The aforesaid low molecular weight aromatic polyamide may be synthesized by any method. For instance, it can be synthesized by reduction of a high molecular weight dinitro compound and thereafter converting the resulting product to a hydrohalogenide or by the halogenation of a high molecular weight dicarboxylic acid. A more desirable method of synthesis is that of reacting an aromatic diamine with an aromatic dicarboxylic acid halide at a temperature of below 100° C. in a solvent. In this method the proportions in which the compounds (7), (8) and (9) are formed and their degrees of polymerization will vary depending upon the basicity of the solvent used. Further, on occasions the unreacted aromatic dicarboxylic acid halides [compounds (3) and (4) ] and aromatic diamine dihydrohalogenides [compounds (5) and (6)] are copresent. As the solvent, any of the hereinafter-given organic liquid media used for dissolving or dispersing the starting materials (i) and/or (ii) and/or (iii) can be used. When such organic liquid media are used, the liquid product containing the low molecular weight aromatic polyamides in solution or dispersion can be used as such without isolation of said polyamides when carrying out its contact with the aqueous slurry of a sodium carbonate hydrate. Hence, the use of the organic liquid medium is convenient.

The aromatic diamine, one of the starting compounds used in preparing the low molecular weight aromatic polyamide (iii), may be any that are usually used in preparing the aromatic polyamides; for example, those having the following formula (10) or (11).

  (10)

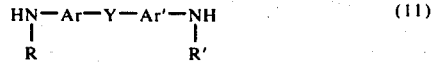  (11)

wherein Ar and Ar' are divalent aromatic rings, it being preferred that the two amino groups are attached to carbon atoms not adjacent to each other in the ring; R and R', which may be the same or different, are either a lower alkyl or phenyl group; and Y, which is an atom or group connecting the adjacent aromatic rings, is either —O—, —S—, —SO$_2$—,

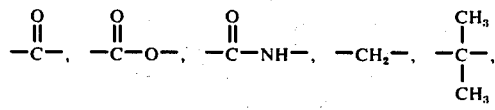

—CH=CH—, —N=N— or —CH=N—.

The aromatic rings as represented in the foregoing formulas as Ar and Ar' are such carbocyclic rings as benzene, naphthalene, anthracene, phenanthrene, biphenyl, terphenyl and phenylnaphthalene or such heterocyclic rings as pyridine and quinoline. The hydrogen atom of these benzene rings may be substituted by a substituent group that does not react with the acid halide or amino groups. As such substituent groups, mention can be made of the halogens, lower alkyl, phenyl, carboalkoxy, alkoxy, acyloxy, nitro, dialkylamino, thioalkyl, carboxyl and sulfonic acid groups.

Specific examples of these aromatic diamines are m-phenylenediamine, p-phenylenediamine, chlorophenylenediamine, methylphenylenediamine, acetylphenylenediamine, aminoanisidine, N-methyl-p-phenylenediamine, N,N'-dimethyl-p-phenylenediamine, N-phenyl-p-phenylenediamine, 1,5-naphthylenediamine, benzidine, bis(aminophenyl)ether, bis(aminophenyl)methane, bis(aminophenyl) keton, bis(aminophenyl) sulfone, diaminobenzanilide, N,N'-phenylene bis(aminobenzamide), diaminoazobenzene, diaminostilbene and diaminobenzenesulfonic acid anilide.

The aromatic dicarboxylic acid halide, the other starting compound used in preparing the low molecular weight aromatic polyamide, may be those which are usually used in preparing the aromatic polyamides; for example, those having the following formula (12) or (13).

wherein X is halogen, of which chlorine is preferred; and Ar and Ar' are as above defined in the case of the foregoing formulas (10) and (11), it being preferred that the two acid halide groups are connected to carbon atoms that are not adjacent to each other in the ring.

Specific examples of such aromatic dicarboxylic acid halides are terephthalic acid chloride, 2,6-naphthalenedicarboxylic acid chloride, 4,4'-biphenyldicarboxylic acid chloride, 5-chloroisophthalic acid chloride, 4-methylisophthalic acid chloride, methylterephthalic acid chloride and bis(p-chloroformylphenyl)ether.

In preparing the low molecular weight aromatic polyamide (iii), it is also permissible to copolymerize along with the aforesaid aromatic diamine and aromatic dicarboxylic acid halide, as a third component, a small quantity of such aromatic disulfonic acid halides as m-benzenedisulfonyl chloride and p-benzenedisulfonyl chloride, such aromatic sulfocarboxylic acid dihalides as m-sulfobenzoic acid dichloride and p-sulfobenzoic acid dichloride, such aforementioned aromatic aminocarboxylic acid halide hydrohalogenides, etc.

The starting materials (i) and/or (ii) and/or (iii) must be used in such amounts that —COX and —NHR·HX in the aforementioned general formulas (1), (2), (3), (4), (5), (6), (7), (8) and (9) are substantially equimolar. Unless the amounts are substantially equimolar, aromatic polyamides of high degrees of polymerization cannot be obtained. By the expression "substantially equimolar amounts" is meant that the —COX terminal group —NHR·HX terminal group ratio is 0.98 – 1.02. That is to say, this means that the total of the —COX terminal groups in the compounds having the general formulas (3), (4) and (9) and the total of the —NHR·HX terminal groups in the compounds having the general formulas (5), (6) and (8) are substantially equal.

The polar, non-basic and inert organic liquid medium used for dissolving or dispersing the starting materials (ii) and/or (iii) in the invention process does not substantially react with the aromatic amino group or the aromatic halide group, and it has the property of dissolving the resulting polyamides to a certain degree. This organic liquid medium must not contain reactive impurities (e.g., water, ammonia, monofunctional alcohols, monofunctional amines and monofunctional isocyanates) in amounts exceeding a certain level. That is, the content of these reactive impurities must be not more than 1%.

As such organic liquid media, there can be named such organic polar solvents as ethers, ketones, lactones, sulfones, halogenated hydrocarbons, nitriles and nitro compounds. From among these, that which is advantageous can be chosen and used in accordance with the foregoing requirements and the several starting materials that are to be used. Not only can these organic liquid media be used alone, but they can also be used as mixtures of two or more thereof. Again, they can also be used as mixtures with other solvents or diluents. Specific examples of the organic liquid media are such ethers as tetrahydrofuran, dioxane, anisole, m-nitroanisole and p-chloroanisole; such ketones as acetone, methyl ethyl ketone, cyclohexanone and acetophenone; such lactones as gamma-butyrolactone and epsilon-caprolactone; such cyclic sulfones as tetramethylene sulfone and 3-methyltetramethylene sulfone; such halogenated hydrocarbons as methylene chloride, chloroform and 1,2-dichloroethane; such nitriles as acetonitrile, propionitrile and benzonitrile; and such aromatic nitro compounds as nitrobenzene. On the other hand, conveniently usable as the diluents are such aromatic hydrocarbons as benzene, toluene, xylene and chlorobenzene and their nuclear halogenated products.

The feature of the present invention resides in carrying out a polymerization reaction by bringing into contact (I) a solution or a dispersion consisting of a solution or dispersion in such an organic liquid medium of a starting material (i) and/or (ii) and/or (iii) with (II) an aqueous slurry consisting of a dispersion in water of a sodium carbonate hydrate, which serves as an acid acceptor.

In this invention the use of the sodium carbonate hydrate in the form of an aqueous slurry as an acid acceptor is requisite. If, instead of the sodium carbonate hydrate, an aqueous solution or slurry of other alkali compounds is used, various troubles occur, and the objects of the present invention cannot be achieved. For instance, when a hydroxide of an alkali metal is used, the polymerization reaction system becomes strongly alkaline, with the consequence that the hydrolysis of the carboxylic acid halide takes place to such an extent as cannot be ignored, and it becomes difficult to obtain a polyamide of a high degree of polymerization. On the other hand, when a hydroxide of an alkaline earth metal is used, in addition to the difficulty of obtaining a polyamide of a high degree of polymerization, there is the disadvantage that since the hydroxides of alkaline earth metals are difficultly soluble in water, it becomes necessary to employ complicated operations such as an acid treatment of the reaction product for removing the alkaline earth metal hydroxides. Again, in the case where potassium carbonate is used as the acid acceptor or an organic amine such as triethylamine is used, in these cases also a polyamide of a high degree of polymerization cannot be obtained.

The sodium carbonate hydrates used in the invention process include, for example, sodium carbonate decahydrate ($Na_2CO_3 \cdot 10H_2O$), sodium carbonate septahydrate ($Na_2CO_3 \cdot 7H_2O$), and sodium carbonate monohydrate ($Na_2CO_3 \cdot H_2O$), of which especially preferred are the decahydrate and septahydrate.

The aqueous slurry of sodium carbonate hydrate (II) may be prepared by any method. For instance, it may be prepared by first preparing the crystals of sodium carbonate decahydrate or septahyerate and then mixing the resulting crystals with water, or it may be prepared by a procedure of precipitating the crystals of the sodium carbonate hydrate by cooling an aqueous solution of anhydrous sodium carbonate. In the latter case, the aqueous solution of sodium carbonate may be cooled while standing still to precipitate large crystals or cooled while stirring the solution to precipitate small crystals.

While the concentration of the sodium carbonate hydrate of the aqueous slurry (II) used in the invention process will vary depending upon the temperature of the aqueous slurry, in general, the proper concentration is provided by the following relationship $$C \geq 0.022 T^2 + 0.31 T + 6.5$$

wherein C is the amount (grams) of anhydrous sodium carbonate per 100 ml of water, and T is the temperature (C). For instance, when a sodium carbonate hydrate is added to 100 ml of water in an amount exceeding 8.6 grams, calculated as anhydrous sodium carbonate, when the temperature of the aqueous slurry is 5° C., a sodium carbonate hydrate-containing aqueous slurry (II) is obtained. In general, a convenient concentration of the solid phase in the aqueous slurry (II) in the case of the invention process, i.e., the content of the sodium carbonate hydrate in the slurry (II), is at least 5% by weight, preferably 10–60% by weight, and more preferably 15–50% by weight. An aqueous slurry whose solid phase concentration is too low possesses no special merits as compared with an aqueous solution of sodium carbonate. On the other hand, an aqueous slurry whose solid phase concentration is too high has poor flow property, with the consequence that there is the disadvantage from the operations standpoint when such an aqueous slurry is to be contacted with the aforementioned starting material-containing solution or dispersion (I). While it is necessary to use the sodium carbonate hydrate in an amount sufficient for neutralizing the total amount of hydrogen halide that is formed by the reaction, usually preferred is an amount, calculated as anhydrous sodium carbonate, of at least 10% in excess of an amount equimolar to the total amount of the aforesaid hydrogen halide.

The aqueous slurry (II) containing the sodium carbonate hydrate may also contain other inorganic salts in such amounts as will not impair the functions of the sodium carbonate used as an acid acceptor. As these inorganic salts, there can be mentioned such chlorides as sodium chloride and potassium chloride, and such bicarbonates as sodium bicarbonate.

Further, this aqueous slurry (II) may also contain the organic solvents that are miscible with water, such as acetone, methyl ethyl ketone and tetrahydrofuran.

The contact of the starting material-containing solution or dispersion (I) with the aqueous slurry (II) is carried out for a period of time sufficient to complete the polymerization at a temperature not exceeding 100° C., and preferably not exceeding 10° C. Any specific means can be employed in contacting the solution or dispersion (I) with the aqueous slurry (II), so long as both can be brought into intimate contact with each other. The intimate contact of the two components can be readily accomplished, say, by mixing the two components with stirring or by spraying or injecting them from a nozzle at the same time. The resulting polyamide can be easily recovered in finely divided form by filtration or centrifugation.

The so obtained finely divided polyamide can be transformed, as required, in customary manner into various forms, for example, fibers, films, paper, liquid products and shaped articles, which can then be utilized for such purposes as industrial materials, insulating materials, resin-reinforcing materials, adhesives, etc.

According to the process of the invention, the yield of the resulting polymer is usually at least 90%, and in many cases, it is quantitative. According to the invention, it is possible to produce a polyamide having a high degree of polymerization which has an inherent viscosity ($\eta_{inh}$) of about 1.5 or more, and even as high as 3 as measured on a solution of 0.5 gram of the polymer in 100 milliliters of concentrated sulfuric acid at 30° C. Unless otherwise specified, the inherent viscosity of each of the final polymers obtained in the examples was measured in accordance with this method.

The following examples will serve to further illustrate the principles and practices of this invention; however, the invention is not intended to be limited to these examples.

EXAMPLE 1

48.1 Grams of m-aminobenzoyl chloride hydrochloride was added to 250 ml of tetrahydrofuran of 3 mg/100 ml water content, after which this mixture was cooled to −25° C. with stirring to prepare a liquid dispersion (I).

Separately, 53 grams of anhydrous sodium carbonate was dissolved in 250 ml of water at room temperature, following which this mixture was cooled to 3° C. with stirring to precipitate sodium carbonate hydrate crystals and thus prepare an aqueous slurry (II) of a solid phase concentration of 35 wt. %.

The foregoing liquid dispersion (I) and aqueous slurry (II) were then mixed for 2 minutes in a domestic mixer with vigorous agitation followed by dilution with 200 ml of water, whereupon was precipitated the resulting polymer as a white powder.

The polymer obtained after filtration, water-washing and drying had an inherent viscosity of 2.41, and the yield was 99%.

CONTROL 1

Example 1 was repeated but using instead of the aqueous slurry (II) an aqueous solution obtained by dissolving 69 grams of potassium carbonate in 250 ml of water and thereafter cooling to 3° C. The resulting polymer was submitted to the same aftertreatment as in Example 1. When the so obtained polymer was measured for its inherent viscosity, it was only 1.67.

CONTROL 2

Example 1 was repeated but using instead of the aqueous slurry (II) a 16° C. aqueous solution obtained by dissolving 53 grams of anhydrous sodium carbonate in 250 ml of water. The inherent viscosity of the resulting polymer obtained after having been given the same aftertreatment as in Example 1 was 1.18.

EXAMPLE 2

A liquid dispersion (I) was prepared in the following manner. 22.6 Grams of m-phenylenediamine dihydrochloride was dispersed in 150 ml of dried tetrahydrofuran to obtain a liquid dispersion, to which was then added a solution of 25.4 grams of isophthalic acid chloride in 100 ml of the same tetrahydrofuran as that used above, after which the whole mixture was cooled to −20° C.

When the so obtained liquid dispersion (I) was mixed with the aqueous slurry (II) prepared in Example 1, with vigorous stirring, the resulting polymer was precipitated as a white powder. The polymer obtained by filtering, water-washing and drying this white powder had an inherent viscosity of 2.01.

CONTROL 3

Example 2 was repeated but using instead of the aqueous slurry (II) the aqueous solution prepared in Control 1. In this case the inherent viscosity of the resulting polymer was only 1.45.

EXAMPLE 3

To a liquid dispersion obtained by dispersing 18.1 grams of m-phenylenediamine dihydrochloride in 50 ml of dried tetrahydrofuran was added a solution of 43.4 grams of methylterephthalic acid chloride in 100 ml of the above-described tetrahydrofuran, following which the mixture was cooled to −25° C. with stirring. To the resulting mixture was added a solution of 10.8 grams of m-phenylenediamine in 100 ml of tetrahydrufuran, the solution being added as a fine stream after cooling to 0° C. and over a period of about 15 minutes, followed by continuing the agitation of the mixture for a further 5 minutes at −25° C. A liquid dispersion (I) was thus obtained.

Separately, 63.6 grams of anhydrous sodium carbonate was dissolved at room temperature in 250 ml of water and, while left standing still, cooled to 5° C. to precipitate sodium carbonate hydrate crystals and thus prepare an aqueous slurry (II) of a solid phase concentration of 42 wt. %.

To the so obtained aqueous slurry (II) was introduced with vigorous stirring the hereinbefore-described liquid dispersion (I) over a period of about 5 second, following which the agitation was continued for a further 2 minutes to precipitate the resulting polymer as a white powder. The so obtained polymer had an inherent viscosity of 2.77.

EXAMPLE 4

A liquid dispersion (I) was prepared in the following manner. 20.3 Grams of isophthalic acid chloride and 38.4 grams of m-aminobenzoyl chloride hydrochloride were added to 150 ml of dried tetrahydrofuran and, after the isophthalic acid chloride had dissolved, the mixture was cooled to −25° C. To the resulting mixture was then added a solution of 10.8 grams of m-phenylenediamine in 100 ml of tetrahydrofuran, the solution being added after cooling to 0° C. and as a fine stream over a period of 10 minutes. The mixture was then stirred for a further 10 minutes.

Separately, 63.6 grams of anhydrous sodium carbonate was dissolved at room temperature in 250 ml of water, after which this solution was cooled to 6° C. with stirring to precipitate sodium carbonate hydrate crystals and thus prepare an aqueous slurry (II) of a solid phase concentration of 42 wt. %.

The hereinbefore-described liquid dispersion (I) was added to the aqueous slurry (II) over a period of 4 seconds with vigorous stirring. after which the mixture was stirred for a further 2 minutes to precipitate the resulting polymer as a white powder. The inherent viscosity of the so obtained polymer was 2.18.

CONTROL 4

Example 4 was repeated but using instead of the aqueous slurry (II) an aqueous solution obtained by dissolving 82.8 grams of potassium carbonate in 250 ml of water followed by cooling to 6° C. The inherent viscosity of the resulting polymer was 1.46 in this case.

EXAMPLE 5

50.8 Grams of isophthalic acid chloride was dissolved in 100 ml of dried tetrahydrofuran, and the solution was cooled to −30° C. While stirring the resulting solution, a solution of 27 grams of m-phenylenediamine in 100 ml of the same tetrahydrofuran as that used hereinabove and cooled to 10° C. was added to the foregoing solution as a fine stream over a period of about 14 minutes to prepare a liquid dispersion (I).

Separately, 143 grams of sodium carbonate decahydrate, 160 grams of 0° C. water and 50 ml of 0° C. methyl ethyl ketone were vigorously agitated to prepare an aqueous slurry (II) of a solid phase concentration of 37 wt. %.

The hereinbefore-described liquid dispersion (I) was added to this aqueous slurry (II) over a period of about 5 seconds, and the two components were mixed for 2 minutes with stirring. The mixture was diluted by adding 200 ml of water, whereupon the resulting polymer was precipitated as a white powder. The so obtained polymer had an inherent viscosity of 3.07.

EXAMPLE 6

60.79 Grams of isophthalic acid chloride was dissolved in 125 ml of dried tetrahydrofuran, and the solution was then cooled to −30° C. While agitating the resulting solution, there was added thereto a solution of 32.48 grams of m-phenylenediamine in 125 ml of the same tetrahydrofuran as that used above, the addition being made after cooling the latter solution to −20° C. and as a fine stream over a period of about 20 minutes. This was followed by the addition of 0.17 gram of benzoyl chloride, after which the mixture was stirred for a further 10 minutes at −30° C. Thus was prepared a liquid dispersion (I).

Separately, 63.6 grams of anhydrous sodium carbonate and 29.3 grams of sodium chloride were dissolved in 250 ml of water at room temperature, after which the resulting solution was cooled to 4° C. with stirring to precipitate sodium carbonate hydrate crystals to thus prepare an aqueous slurry (II) of a solid phase concentration of 43 wt. %.

The foregoing liquid dispersion (I) was added over a period of 3 seconds to the aqueous slurry (II) with vigorous stirring followed by stirring the mixture for a further 3 minutes, whereupon the resulting polymer was precipitated as a white powder. The inherent viscosity of the so obtained polymer was 2.01.

CONTROL 5

Example 6 was repeated but instead of the aqueous slurry (II) a solution of 48 grams of sodium hydroxide in 250 ml of water cooled to 4° C. was mixed with the liquid dispersion (I) with vigorous stirring. There was no precipitation of polymer, and the whole system became white and turbid. When 400 ml of water was added to this liquid dispersion and stirred, precipitation finally occurred. When this precipitate was filtered, water-washed and dried, and the inherent viscosity of the polymer was measured, it was 0.21.

CONTROL 6

Example 6 was repeated but using instead of the aqueous slurry (II) an aqueous slurry obtained by mixing 44.5 grams of calcium hydroxide and 250 ml of water for 24 hours in a ball mill followed by cooling mixture to 4° C. When the aqueous slurry was mixed with the liquid dispersion (I) with vigorous stirring, a precipitate was formed. This precipitate was separated by filtration, water-washed and dried. When for measuring its inherent viscosity an attempt was made to dissolve this precipitate in concentrated sulfuric acid, a clear solution could not be obtained, because the polymer obtained contained unreacted calcium hydroxide. So, the system whose polymerization has been completed was first rendered acidic by means of hydrochloric acid, and the filtration, water-washing, neutralization and water-washing operation of the precipitate was repeatedly carried out followed by drying. The product thus obtained could now be dissolved clearly in concentrated sulfuric acid. However, the inherent viscosity of the resulting polymer was only 1.22.

EXAMPLE 7

Twenty-four grams of p-aminobenzoyl chloride hydrochloride and 24 grams of m-aminobenzoyl chloride hydrochloride were added to 300 ml of well-dried gamma-butyrolactone, after which the mixture was cooled to −30° C. while throughly stirring the mixture. Thus was obtained a liquid dispersion (I).

Separately, 53 grams of anhydrous sodium carbonate was dissolved at room temperature in 300 ml of water, after which the resulting solution was cooled to 20° C. with stirring to precipitate sodium carbonate hydrate crystals to thus prepare an aqueous slurry (II) of a solid phase concentration of 27 wt. %.

When the foregoing liquid dispersion (I) and aqueous slurry (II) were mixed for 2 minutes with vigorous stirring, the whole system became white and turbid, but when this was diluted by the addition of 300 ml of water, the resulting polymer was precipitated as a white powder. The inherent viscosity of the so obtained polymer was 1.33.

EXAMPLE 8

50.77 Grams of isophthalic acid chloride was dissolved in 125 ml of tetrahydrofuran containing 2 mg/100 ml of water, after which the solution was cooled to −25° C. While stirring the resulting solution, a solution of 27.04 grams of metaphenylenediamine in 125 ml of the same tetrahydrofuran as that used above was added to the first-named solution as a fine stream over a period of about 15 minutes to prepare a liquid dispersion (I).

Separately, 53 grams of anhydrous sodium carbonate was dissolved at room temperature in 250 ml of water, which solution was then cooled to 5° C. with stirring to precipitate sodium carbonate hydrate crystals to thus prepare an aqueous slurry (II) of a solid phase concentration of 33 wt. %.

When the foregoing liquid dispersion (I) and aqueous slurry (II) were mixed with vigorous stirring followed by continuing the stirring for a further 2 minutes, and the mixture was diluted by the addition of 200 ml of water, the resulting polymer was precipitated as a white powder. The inherent viscosity of the polymer obtained after filtration, water-washing and drying was 3.21, and the yield was 99%.

CONTROL 7

Example 8 was repeated but using instead of the aqueous slurry (II) an aqueous solution obtained by dissolving 69 grams of potassium carbonate in 250 ml of water and cooling the solution to 5° C. The polymer formed was submitted to the same aftertreatment as in Example 8. When the so obtained polymer was measured for its inherent viscosity, it was only 2.11.

CONTROL 8

Example 8 was repeated but using instead of the aqueous slurry (II) an aqueous solution obtained by dissolving 53 grams of anhydrous sodium carbonate in 500 ml of water followed by cooling the solution to 7° C. In this case, when this aqueous solution and the aqueous dispersion (I) were mixed with vigorous stirring, the reaction mixture temporarily became a viscous mass, after which there was precipitated a coarse granular polymer, The stirring was continued for a further 2 minutes followed by dilution with water and submission to the same after-treatment as in Example 8 to obtain a polymer having an inherent viscosity of 1.50. The yield was 90%.

EXAMPLE 9

76.90 Grams of isophthalic acid chloride was dissolved in a stream of nitrogen in 125 ml of thoroughly dried tetrahydrofuran, following which the solution was cooled to −30° C. While gently stirring this solution, a solution of 40.55 grams of metaphenylenediamine in 125 ml of the same tetrahydrofuran as that used above, after cooling to −10° C., was added as a fine stream to the foregoing solution over a period of about 20 minutes. The mixture was then stirred for a further 5 minutes to prepare a liquid dispersion (I).

Separately, 63.6 grams of anhydrous sodium carbonate was dissolved at room temperature in 250 ml of water. This solution was cooled to 7° C. while left standing still to precipitate sodium carbonate hydrate crystals and prepare an aqueous slurry (II) of a solid phase concentration of 40 wt. %.

While vigorously stirring this aqueous slurry (II), the foregoing aqueous dispersion (I) was introduced thereto over a period of about 5 seconds, whereupon the resulting polymer was precipitated as a white powder. The inherent viscosity of this polymer was 2.46.

EXAMPLE 10

48.73 Grams of isophthalic acid chloride was dissolved in 125 ml of dried tetrahydrofuran, and the solution was cooled to −25° C. While stirring the so obtained solution, a solution of 25.95 grams of metaphenylenediamine in 125 ml of the same tetrahydrofuran as that used above, after being cooled to 0° C., was added to the foregoing solution as a fine stream over a period of about 15 minutes. This was followed by adding 23.07 grams of metaaminobenzoyl chloride hydrochloride to the resulting mixture, after which the mixture was held at −25° C. for about 5 minutes while continuing the stirring. Thus was prepared a liquid dispersion (I).

Separately, 143 grams of sodium carbonate decahydrate was added 160 grams of water followed by vigorous stirring to prepare an aqueous slurry (II) of a solid phase concentration of 37 wt. %.

The foregoing aqueous dispersion (I) was added to this aqueous slurry (II) over a period of about 5 seconds, after which the stirring of the mixture was continued for 2 minutes, whereupon was precipitated the resulting polymer as a white powder. The inherent viscosity of the so obtained polymer was 2.38.

EXAMPLE 11

60.92 Grams of isophthalic acid chloride was dissolved in 125 ml of tetrahydrofuran containing 2 mg/100 ml of water, after which the solution was cooled to −20° C. While stirring the so obtained solution, there was added thereto a solution of 32.44 grams of metaphenylenediamine in 125 ml of the same tetrahydrofuran as that used above, the addition being made after cooling the latter solution to −15° C. and as fine stream over a period of about 10 minutes. This was followed by the addition of 0.11 gram of aniline to the mixture and continuance of the stirring for 10 minutes at −25° C. Thus was prepared a liquid dispersion (I).

Separately, 63.6 grams of anhydrous sodium carbonate was dissolved in 250 ml of water at room temperature followed by cooling the solution to 6° C. with stirring to precipitate sodium carbonate hydrate crystals to prepare an aqueous slurry (II) of a solid phase concentration of 42 wt. %.

While vigorously stirring this aqueous slurry (II), the foregoing liquid dispersion (I) was added thereto over a period of 4 seconds. When the agitation was continued for a further 2 minutes, the resulting polymer was precipitated as a white powder. The inherent viscosity of the so obtained polymer was 2.02.

CONTROL 9

Example 11 was repeated but using instead of the aqueous slurry (II) an aqueous solution obtained by dissolving 82.8 grams of potassium carbonate in 250 ml of water and cooling the solution to 5° C. The inherent viscosity of the resulting polymer was 1.35.

EXAMPLE 12

50.77 Grams of isophthalic acid chloride was dissolved in 125 ml of thoroughly dried gamma-butyrolactone, and the solution was cooled to −20° C. While stirring the so obtained solution, there was added thereto a solution of 47.50 grams of 4,4'-diaminodiphenylmethane in 125 ml of the same gamma-butyrolactone as that used above over a period of about 10 minutes after cooling the solution to 0° C. Thus was prepared a liquid dispersion (I).

When this liquid dispersion (I) was added over a period of 5 seconds to 250 ml of the aqueous slurry (II) of Example 8 with vigorous stirring, the whole system became a white suspension. When 200 ml of water was added to this mixture, the resulting polymer was precipitated as a white powder. The inherent viscosity of the so obtained polymer was 2.07.

EXAMPLE 13

45.68 Grams of terephthalic acid chloride was dissolved in 125 ml of dried 3-methyl sulforan, and the solution was cooled to −15° C. While stirring the so obtained solution, there was added thereto a solution of 24.33 grams of metaphenylenediamine in 125 ml of 3-methyl sulforan cooled to −10° C., which addition was made over a period of about 30 minutes to obtain a liquid dispersion (I).

Separately, 38.16 grams of anhydrous sodium carbonate was dissolved in 250 ml of water followed by cooling the solution to 3° C. with stirring to precipitate sodium carbonate hydrate crystals. Thus was prepared an aqueous slurry (II) of a solid phase concentration of 21 wt. %.

When the foregoing liquid dispersion (I) and aqueous slurry (II) were mixed with vigorous agitation, the whole system became white and turbid, but on addition of 300 ml of water thereto, the resulting polymer was precipitated. The inherent viscosity of the so obtained polymer was 1.80.

CONTROL 10

Example 13 was repeated but using instead of the aqueous slurry (II) an aqueous solution obtained by dissolving 38.16 grams of anhydrous sodium carbonate in 250 ml of water and cooling to 10° C. This aqueous solution was mixed with the liquid dispersion (I) with vigorous stirring, followed by carrying out the same treatment as in Example 13 to obtain a polymer whose inherent viscosity was 0.98.

CONTROL 11

Example 13 was repeated but using instead of the aqueous slurry (II) an aqueous solution of 28.8 grams of sodium hydroxide in 250 ml of water cooled to 0° C. When this aqueous solution was mixed with the liquid dispersion (I) with vigorous stirring, the whole system became white and turbid. But when 200 ml of water was added, the resulting polymer was precipitated as a white powder. The inherent viscosity of the so obtained polymer was 0.32.

CONTROL 12

Example 13 was repeated but using instead of the aqueous slurry (II) an aqueous solution obtained by dissolving 72.7 grams of triethylamine in 250 ml of water followed by cooling the solution to 0° C. This aqueous solution was mixed with the liquid dispersion (I) with vigorous stirring. By carrying out the treatment as in Example 13 there was obtained a polymer whose inherent viscosity was 0.44.

EXAMPLE 14

22.84 Grams of terephthalic acid chloride and 26.89 grams of p-sulfobenzoic acid dichloride were dissolved in 125 ml of dried tetrahydrofuran followed by cooling the solution to −20° C. While agitating this solution, there was added thereto a solution of 24.33 grams of metaphenylenediamine in 125 ml of the same tetrahydrofuran as that used above, the addition being made after cooling the solution to −5° C. and over a period of about 10 minutes. Thus was prepared a liquid dispersion (I).

When this liquid dispersion (I) was mixed with the aqueous slurry (II) of Example 13 with vigorous stirring, the resulting polymer was obtained as a white precipitate. The inherent viscosity of the polymer was 2.37.

EXAMPLE 15

The aqueous slurry (II) of sodium carbonate hydrate crystals prepared in Example 8 was filtered while still in its low temperature state. The crystals were then washed 3 times in cold water and then twice in acetone, after which they were dried for 5 hours under reduced pressure. The melting point of the resulting crystals was 34°– 35° C., which was in agreement with that of sodium carbonate decahydrate ($Na_2CO_3 \cdot 10H_2O$).

Further, when 13.81 grams of these crystals were treated for 4 hours in a 200° C. hot blast stove, the weight became 5.18 grams. The reduction in weight during this period was 62.5%, which agreed well with the theoretical weight decrease when all the $H_2O$ of $Na_2CO \cdot 10H_2O$ was removed.

EXAMPLE 16 – 19 AND CONTROL 13

In a stainless steel 6-liter vessel 1,211 grams of metaphenylenediamine was dissolved in 4.5 liters of dried tetrahydrofuran, after which the resulting solution was cooled to −20° C. Separately, in a stainless steel 10-liter vessel 2,269 grams of isophthalic acid chloride was dissolved in 3.5 liters of dried tetrahydrofuran with stirring following which the resulting solution was cooled to −24° C. While agitating the latter solution, there was added thereto the former solution as a fine stream by means of a nozzle having an inside diameter of 1.2 mm, the addition being over a period of about 30 minutes. Thus was prepared a liquid dispersion (I). While the temperature of the liquid dispersion (I) rose to −7° C., this was cooled to −20° C.

Separately, four aqueous slurries of sodium carbonate hydrate (II) and one aqueous sodium carbonate solution were prepared under the conditions indicated in the following table.

| Example | Total sodium carbonate (g) | Water (l) | Temperature (° C) | Slurry or solution | Solid phase Concentration of aqueous slurry (II) (wt. %) | Inherent viscosity of resulting polymer |
|---|---|---|---|---|---|---|
| 16 | 364 | 3.0 | 8 | Slurry | 5 | 2.18 |
| 17 | 520 | 3.0 | 8 | Slurry | 19 | 2.33 |
| 18 | 570 | 2.4 | 8 | Slurry | 30 | 2.56 |
| 19 | 570 | 2.0 | 2 | Slurry | 51 | 2.41 |
| Control 13 | 520 | 4.0 | 8 | Solution | — | 1.48 |

To the aqueous slurry (II) or aqueous solution of the foregoing table was added 2.0 liters of the foregoing liquid dispersion (I) with vigorous stirring over a period of about 15 seconds, after which the stirring was continued for a further 2 minutes, whereupon the resulting polymer was precipitated as a white powder. This polymer was separated by filtration, water-washed and dried, and its inherent viscosity was measured. The results obtained are shown in the foregoing table.

On the other hand, when the solubility of the polymer in N-methylpyrrolidone (15 wt. %) was investigated, a clear solution could be obtained in the case of the polymers formed in Examples 16 – 19, but in the case of the polymer formed in Control 13 the solution was not clear, and some turbidity was noted.

EXAMPLE 20

A solution obtained by dissolving 7.11 grams of isophthalic acid chloride and 3.05 grams of terephthalic acid chloride in 125 ml of dried methyl ethyl ketone was cooled to −5° C. While gently stirring this solution, there was added thereto a solution of 5.41 grams of metaphenylenediamine in 125 ml of the same methyl ethyl ketone as that used above as a fine stream over a period of about 10 minutes to thereby prepare a liquid dispersion (I).

Separately, 30 grams of anhydrous sodium carbonate was dissolved in 250 ml of water at room temperature, after which this solution was cooled to 2° C. with stirring to precipitate crystals of a sodium carbonate hydrate to prepare an aqueous slurry (II) of a solid phase concentration of 13 wt. %.

The foregoing liquid dispersion (I) and aqueous slurry (II) were mixed with vigorous stirring. The agitation of the mixture was continued for a further 2 minutes, after which 200 ml of water was added, whereupon the resulting polymer was precipitated as a white powder. The polymer obtained after filtration, water-washing and drying had an inherent viscosity of 2.31.

CONTROL 14

Example 20 was repeated but using instead of the foregoing aqueous slurry (II) an aqueous solution of 10.6 grams of anhydrous sodium carbonate in 250 ml of water cooled to 1° C. The inherent viscosity of the polymer obtained was 1.57.

EXAMPLE 21

71.06 Grams of isophthalic acid chloride was dissolved in 125 ml of tetrahydrofuran containing 3 mg/100 ml of water, after which the resulting solution was cooled to −25° C. While stirring this solution, there was added thereto a solution of 37.89 grams of metaphenylenediamine in 125 ml of the same tetrahydrofuran as that used above as a fine stream over a period of about 10 minutes to prepare a liquid dispersion (I).

About 10 ml of this liquid dispersion (I) was taken and separated into a solid phase and a liquid phase using a centrifuge. When the infrared absorption spectrum of the solid phase portion was measured by the KBr method, a major portion was the absorption of poly(metaphenyleneisophthalamide). In addition, there were observed an absorption at 1750 cm⁻¹ ascribable to acid chloride and a broad absorption at 2500 – 3100 cm⁻¹ ascribable to aminohydrochloride. The inherent viscosity of the product obtained after washing this solid phase portion with acid, alkali and water was 0.11. Next, when tetrahydrofuran was evaporated from the liquid phase portion and the infrared absorption spectrum of the resulting residue was measured, a sharp absorption ascribable to acid chloride and an absorption resembling that of isophthalanilide were observed. The inherent viscosity of the product obtained after washing this residue with acid, alkali and water was 0.04.

Further, about 10 ml of the foregoing liquid dispersion (I) was dropped into dilute hydrochloric acid while stirring the latter, after which the stirring was continued for a further one hour. The mixture was then left standing overnight. The reaction mixture was then divided into a solid phase portion and a liquid phase portion. First, when tetrahydrofuran was removed from the liquid phase portion by evaporation and the pH of the residue was adjusted to 10, 0.06 gram of acicular crystals were precipitated. The infrared absorption spectrum of the crystals obtained after filtering, water-washing and drying same was in agreement with

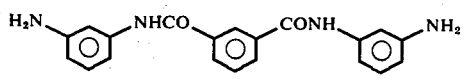

(3′,3″-diaminoisophthalbisanilide). The residue obtained after evaporating the filtrate to dryness was extracted with methanol, following which the extract was submitted to gas chromatography to obtain 0.14 gram of metaphenylenediamine. Next, the solid phase portion was stirred for 2 hours in an aqueous 5% caustic soda solution, following which the precipitate remaining undissolved was filtered off and water-washed to obtain 0.83 gram of the product. The inherent viscosity of this product was 0.10, and its infrared absorption spectrum was in approximate agreement with that of poly(metaphenyleneisophthalamide). On the other hand, when that portion that was dissolved in the aqueous 5% caustic soda solution was neutralized, 0.30 gram of a precipitate was obtained. The infrared absorption spectrum of this precipitate was in approximate agreement with that of isophthalic acid.

From the foregoing results, it was found that the product obtaind by reacting isophthalic acid chloride with metaphenylenediamine in tetrahydrofuran consisted of a low molecular weight poly(metaphenyleneisophthalamide), metaphenylenediamine-dihydrochloride and unreacted isophthalic acid chloride.

EXAMPLE 22

A solution obtained by dissolving 74.2 grams of anhydrous sodium carbonate in 300 ml of water at room temperature was cooled to 7° C. with gentle agitation thereby precipitating fine acicular crystals to prepare an aqueous slurry (II) of a solid phase concentration of 39 wt. % (of the total sodium carbonate contained in this slurry, the proportion of that present as a solid phase was 73 wt. %).

While vigorously stirring this aqueous slurry (II) with a domestic mixer, the liquid dispersion (I) prepared in Example 21 was added thereto over a period of 2 seconds. When 300 ml of water was added after continuing the agitation of the mixture for a further 2 minutes, the resulting polymer was precipitated as a white powder. The inherent viscosity of this polymer was 2.65.

EXAMPLE 23

To a solution obtained by dissolving 50.8 grams (0.25 mol) of isophthalic acid chloride in 250 ml of dried tetrahydrofuran were added 22.6 grams (0.125 mol) of metaphenylenediamine-dihydrochloride and 52.9 grams (0.125 mol) of 3′,3″-diaminoisophthalbisanilide-dihydrochloride

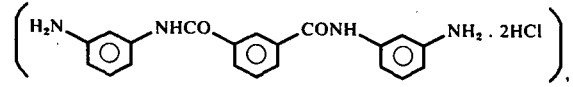

following which the mixture was cooled to −25° C. with thorough stirring to prepare a liquid dispersion (I).

Separately, an aqueous solution of 70 grams of anhydrous sodium carbonate in 300 ml of water was cooled to 4° C. to prepare an aqueous slurry (II) of a solid phase concentration of 39 wt. %.

While vigorously stirring this aqueous slurry (II), there was added thereto the foregoing liquid dispersion (I) over a period of 5 seconds. When the mixture was stirred for a further 2 minutes followed by the addition of 300 ml of water, the resulting polymer was precipitated as a white powder. The inherent viscosity of the so obtained polymer was 2.14, and its infrared absorption spectrum was in perfect agreement with that of poly(metaphenyleneisophthalamide).

EXAMPLE 24

To a solution obtained by dissolving 50.8 grams (0.25 mol) of isophthalic acid chloride in 220 ml of dried tetrahydrofuran and 30 ml of dried toluene were added 18.1 grams (0.10 mol) of metaphenylenediaminedihydrochloride, 63.5 grams (0.15 mol) of 3',3''-diaminoisophthalbisanilidedihydrochloride and 38.4 grams (0.20 mol) of m-aminobenzoylchloride hydrochloride, following which the mixture was cooled to −25° C. with thorough stirring to prepare a liquid dispersion (I).

While vigorously stirring the aqueous slurry (II) prepared in Example 23, the foregoing liquid dispersion (I) was added thereto. When the agitation was continued for a further 2 minutes followed by the addition of 300 ml of water, the resulting polymer was obtained as a white powder. The inherent viscosity of the polymer was 1.81.

EXAMPLE 25

A solution of 6.11 grams of 2,4-toluenediamine in 100 ml of cyclohexanone was slowly added to a solution of 10.15 grams of isophthalic acid chloride in 100 ml of dried cyclohexanone to prepare a semitransparent solution (I). Separately, 30 grams of sodium carbonate and 30 grams of sodium chloride were dissolved in 200 ml of water, after which the solution was cooled to 3° C. to prepare an aqueous slurry (II). When the foregoing solution (I) was added over a period of 2 seconds to this aqueous slurry (II) with vigorous stirring followed by continuing the agitation for a further 2 minutes, the reaction mixture became a white suspension. When 300 ml of water was added to this recction mixture and the mixture was gently stirred, the resulting polymer was precipitated as a white powder. The inherent viscosity of the polymer was 1.86.

EXAMPLE 26

5.43 Grams of methylterephthalic acid chloride and 5.43 grams of 4-methylisophthalic acid chloride were dissolved in 125 ml of dried cyclohexanone, and the solution was cooled to 0° C. To this solution was then added a solution of 5.41 grams of metaphenylenediamine in 75 ml of cyclohexanone to prepare a practically transparent solution (I). Separately, 40 grams of sodium carbonate was dissolved in 200 ml of water followed by cooling the solution to 2° C. to prepare an aqueous slurry (II) of a solid phase concentration of 29 wt. %.

The foregoing solution (I) was added to this aqueous slurry (II) with vigorous stirring followed by continuing the agitation for a further 2 minutes. When 300 ml of water was added to the foregoing mixture and the mixture was stirred gently, the resulting polymer was precipitated as a white powder. The inherent viscosity of this polymer was 1.67.

EXAMPLE 37

30.45 Grams of terephthalic acid chloride was dissolved in 125 ml of dried tetrahydrofuran, after which the solution was cooled to −10° C. While stirring the resulting solution, there was added thereto over a period of about 15 minutes as a fine stream a solution of 18.32 grams of N-methyl-p-phenylenediamine in 125 ml of the same tetrahydrofuran as that used above to prepare a liquid dispersion (I).

Separately, 53.0 grams of anhydrous sodium carbonate was dissolved in 250 ml of water at room temperature followed by cooling the solution to 5° C. to precipitate sodium carbonate hydrate crystals and form an aqueous slurry (II) of a solid phase concentration of 33 wt. %.

The foregoing liquid dispersion (I) and aqueous slurry (II) were mixed with vigorous stirring followed by continuing the agitation for a further 2 minutes. When the mixture was then diluted by the addition of 200 ml of water, the resulting polymer was precipitated as a white powder. The polymer obtained after filtration, water-washing and drying had an inherent viscosity of 2.21.

We claim:

1. A process for preparing a fiber-forming aromatic polyamide, which comprises contacting (I) a solution or dispersion, in a polar, non-basic and inert organic liquid medium, of a low molecular weight aromatic polyamide having an inherent viscosity of no greater than 0.2 as measured in a solution of 0.5 gram of the polyamide in 100 ml. of concentrated sulfuric acid at 30° C., with (II) an aqueous slurry consisting of a dispersion in water of a sodium carbonate hydrate in a concentration of at least 5% by weight, said solution or dispersion (I) being a product obtained by reacting an aromatic diamine and an aromatic dicarboxylic acid halide in said liquid medium.

2. The process of claim 1 which comprises contacting said solution or dispersion (I) with said aqueous slurry (II) by mixing same with stirring at a temperature not exceeding 100° C.

3. The process of claim 1 wherein said polar, non-basic and inert organic liquid medium is selected from the group consisting of ethers, ketones, lactones, sulfones, halogenated hydrocarbons, nitriles and nitro compounds.

4. The process of claim 1 wherein sodium carbonate hydrate is present in a concentration of 10–60% by weight.

5. The process of claim 1 wherein said aromatic diamine and aromatic dicarboxylic acid halide are reacted at a temperature not exceeding 100° C.

* * * * *